2 Sheets—Sheet 1

R. M. ATWATER.
Manufacture of Glass and Furnaces Therefor.
No. 212,168. Patented Feb. 11, 1879.

R. M. ATWATER.
Manufacture of Glass and Furnaces Therefor.
No. 212,168. Patented Feb. 11, 1879.

Witnesses
J. M. Dumer
Harry Smith

Inventor
Richard M. Atwater
by his Attorneys
Howson & Son

UNITED STATES PATENT OFFICE.

RICHARD M. ATWATER, OF MILLVILLE, N. J., ASSIGNOR TO HIMSELF AND WHITALL, TATUM & CO., OF PHILADELPHIA, PA.

IMPROVEMENT IN THE MANUFACTURE OF GLASS AND FURNACES THEREFOR.

Specification forming part of Letters Patent No. 212,168, dated February 11, 1879; application filed January 9, 1879.

*To all whom it may concern:*

Be it known that I, RICHARD M. ATWATER, of Millville, Cumberland county, New Jersey, have invented a new and useful Improvement in and Furnaces for the Manufacture of Glass, of which the following is a specification:

The main object of my invention is the saving of time, fuel, and fluxes in glass-houses, by melting a batch of glass ingredients in one furnace at the high temperature demanded for the first melting, and then discharging the molten glass into a separate working-furnace, where the more moderate heat required in working the glass may be employed.

Another object of my invention is to utilize the waste heat of the working-furnaces by combining a tempering oven or ovens with the same, in the manner described hereinafter.

It has heretofore been usual to melt the batches of glass ingredients in crucibles in the same furnace from which it is gathered by the workmen. This plan is objectionable for several reasons, the most prominent of which is the large extent of space required for the crucibles, and the consequent demand for the consumption of a large amount of fuel and fluxes.

In carrying my invention into effect, I prefer the apparatus illustrated in the accompanying drawings, in which—

Figure 1:
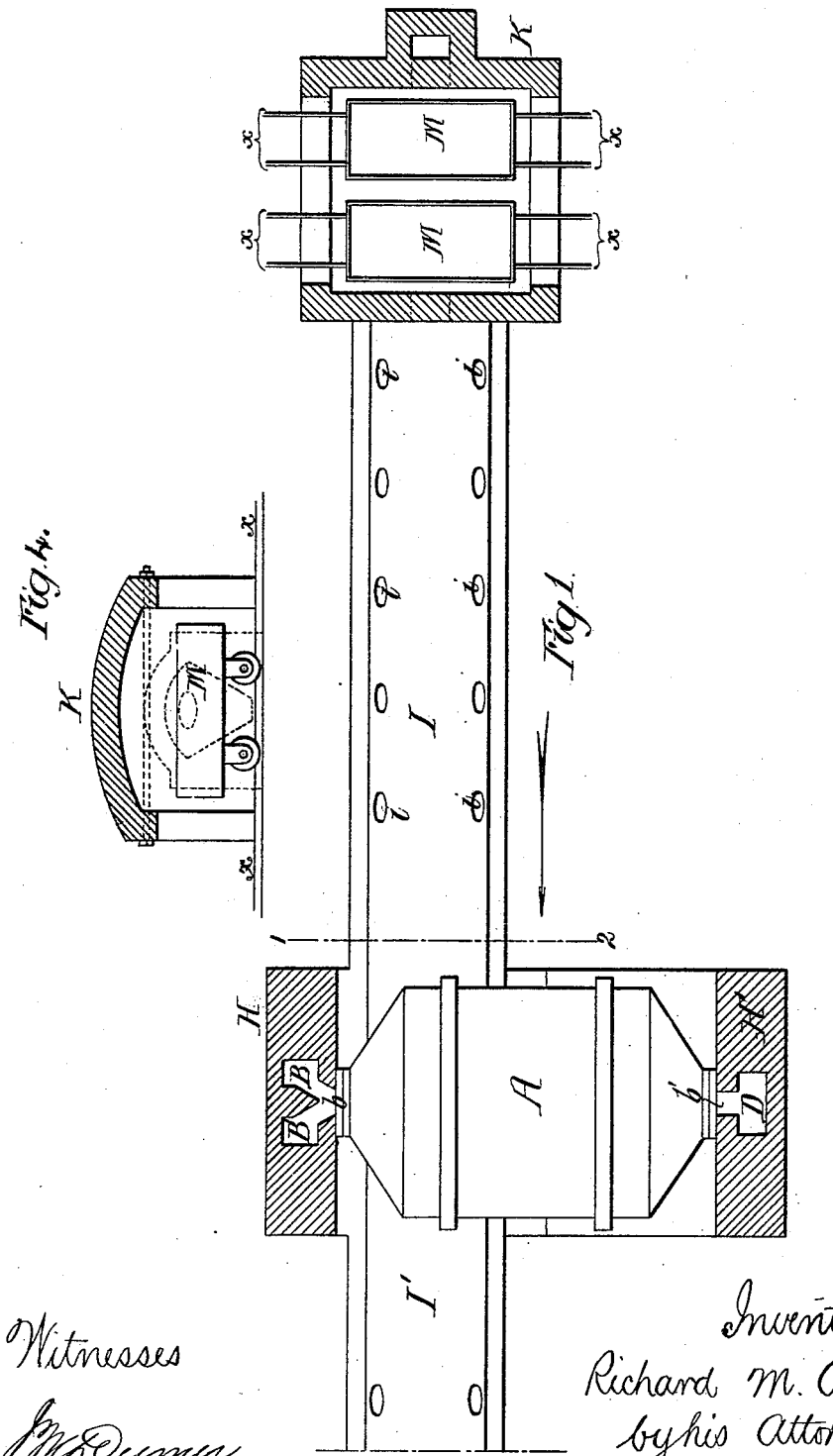
Figure 2:
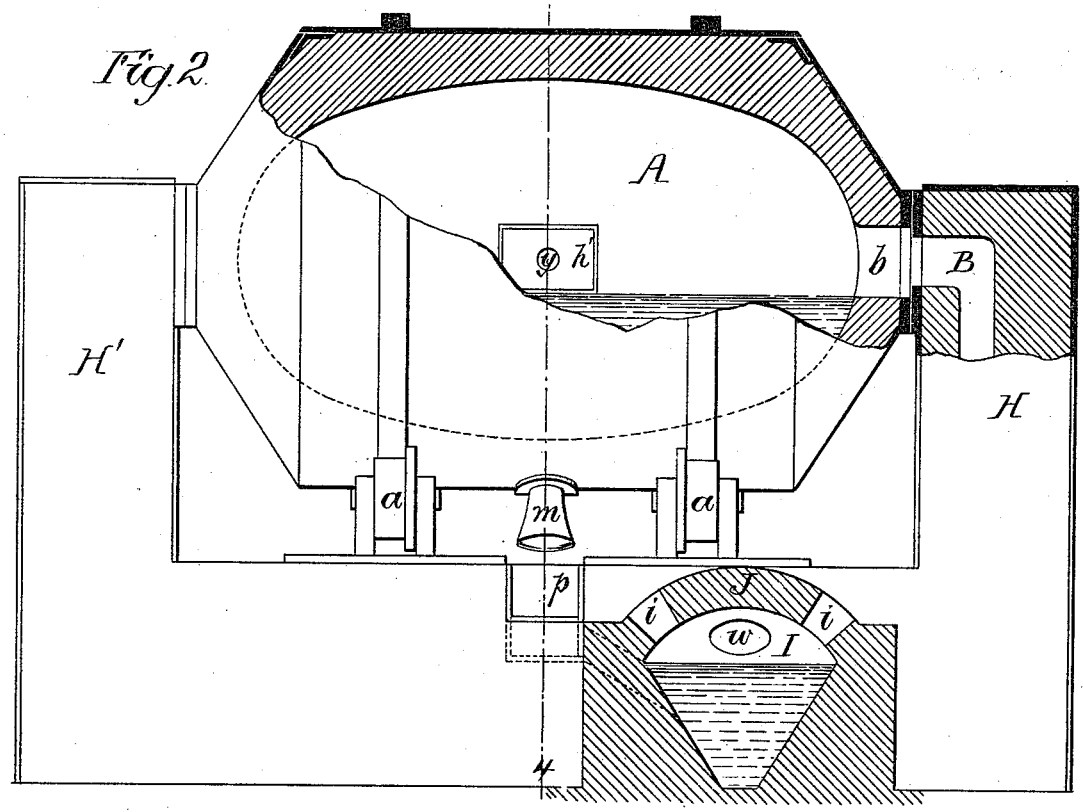
Figure 3:
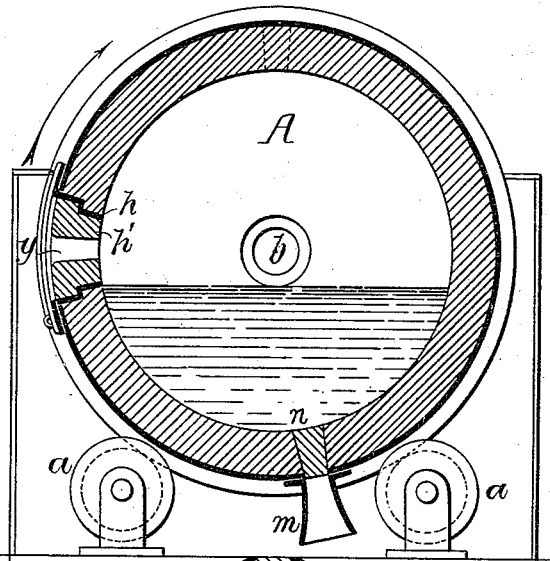

Figure 1, Sheet 1, is a plan view showing the melting-furnace, one working-furnace, a tempering-oven, and part of a second working-furnace; Fig. 2, Sheet 2, a vertical section, drawn to an enlarged scale, on the line 1 2, Fig. 1, looking in the direction of the arrow, and showing the melting-furnace partly in section; Fig. 3, a transverse section on the line 3 4, Fig. 2; and Fig. 4, Sheet 1, a vertical section of the tempering-oven.

While the melting-furnace may be fixed, I prefer to make it movable, for reasons explained hereinafter.

This furnace A is made in the present instance cylindrical in the middle, and with opposite tapering ends, and consists of substantial iron plates properly lined with refractory material, the furnace being supported by rollers $a$, so that it can be turned at pleasure.

The furnace has at one end a central opening, $b$, communicating with the two passages B B', Fig. 1, in the brick-work H, and at the opposite end a like opening, $b'$, communicating with the passage D in the brick-work H'.

The furnace is charged with a batch of glass ingredients through an opening, $h$, which is furnished with a suitable detachable cover, $h'$, lined with refractory material.

Inflammable gases from a generator are directed through one of the passages B into the furnace, and heated air through the adjoining passage, these elements combining at the entrance of the furnace and producing an intense heat, which acts directly on the batch of glass ingredients. The products of combustion, which finally escape through the central opening, $b'$, may be employed to heat the volumes of air or gas, or both, prior to their introduction into the furnace, in a manner which is too well known in connection with other furnaces to need description here.

The upper portion of the batch of glass and the lining of the furnace above the same necessarily become more intensely heated than the lower portion of the batch and the lining below it. To compensate for this, and in order to subject the entire batch to the same temperature, or nearly so, and facilitate the melting and clearing operation, the furnace is turned on its rollers to the extent of one-half of a revolution at suitable intervals. This brings the highly-heated portion of the lining in direct contact with that portion of the batch which had previously received the least heat. At the same time the pasty semi-fluid glass adhering to the lining, as the furnace is turned, is exposed to the direct action of the flame in a condition most favorable to quick and thorough melting and clearing and this action may be further promoted by making the inner surface of the lining rough or corrugated.

From opposite sides of the structure which supports the melting-furnace extend the two working furnaces or troughs I I', each of which, as seen in the transverse section, Fig. 2, is made with sides converging from the top, which has an arched roof, J, having working-holes $i$ through which the workmen gather the glass. When one of these troughs—say the trough I—has to receive a supply of molten glass from the furnace A, the latter is turned until the spout $m$ is in the position shown in Fig. 3, and the fire-clay plug which closes the opening $n$ in the lining communicating with the spout is removed, after which the contents of the furnace will flow down the inclined plane $p$ and through the passage $q$, or through other convenient channels, into the trough I, after which the opening $n$ may be re-plugged, the furnace recharged, and the melting of the second batch may be proceeded with as before, while the workmen stationed near the working-holes proceed with their duties.

It is here where economy of time becomes most apparent, for there is no waiting on the part of workmen for batches of glass to melt, as is the case with ordinary furnaces, and there is always a new batch of melted glass ready when that in the trough has been exhausted.

I prefer to furnish the tapping-hole $n$ with a plug so fitted to the lining that it can be readily driven inward when the glass has to be withdrawn from the furnace.

A flame derived from combined air and gas enters each trough through an opening, $w$, at the end nearest the melting-furnace, and, if desired, at other suitable points, and this flame is continued through the trough, where it acts on the surface of the glass, and finally escapes at a reduced temperature into the tempering-chamber K, and thence through a chimney or other suitable outlet.

On the floor of this chamber are one or more tracks, $x$, (two in the present instance,) adapted to the wheels of metal cars M, which can be introduced into and withdrawn from the chamber through openings on opposite sides of the same, each opening being provided with suitable sliding or otherwise movable doors.

When the working-trough is in operation, one of the cars is always in the tempering-chamber, the doors of the latter being closed, and the articles of glass, as fast as they are blown, pressed, or molded, are placed in the car through a suitable opening in the brick-work above the door or in the door itself.

When the car is full, a suitable cover is placed over it, or sand is deposited on the articles, so as to exclude the air, after which the car is moved to any out-of-the-way place, in order that its contents may be gradually cooled, an empty car being introduced into the chamber for receiving another lot of glass objects.

Returning to the working-trough, it should be understood that the supplies of air and gas are so graduated that the heat will not be as intense as in the melting-furnace, for in order to properly work glass it must be maintained at a much lower temperature than is required to melt it in the first instance, the temperature required for melting the batch of glass ingredients being 2,400° Fahrenheit, and that for maintaining the glass in a proper condition for being worked 1,400° Fahrenheit.

The heat being applied to the upper surface only of the glass in the trough, no impurities can rise, and there will be an absence of blisters.

The shape of the trough as illustrated is desirable, as it insures the presentation of an extended surface area of glass to the flame. The shape, moreover, tends to preserve the integrity of the interior of the trough, and renders the detaching of particles of the lining difficult.

The shape and size of the trough will demand more or less alteration when large masses of glass have to be gathered, as in the manufacture of carboys and window-glass.

Another advantage of the peculiar shape of the working-trough is, that when the glass is reduced in quantity, it occupies a contracted space, and hence there is less waste than if the furnace had vertical sides.

It may be remarked here that the working furnaces or troughs should be heated before glass is introduced into them.

There should be in the melting-furnace, and preferably in the cover $h'$ of the feed-opening, a spy-hole, $y$, which is always above the surface of the glass, the furnace being turned from the position Fig. 3 in the direction of the arrow to the extent of one-half only of its circumference, and then back again at such intervals as the condition of the charge may suggest.

The molten glass may be removed from the melting-furnace through the charging-opening, if desired.

I claim as my invention—

1. As an improvement in preparing glass for being manufactured into different articles, first melting the glass in one furnace at a high temperature, and then tapping the contents into a separate and independent working furnace or trough maintained at a lower temperature, substantially as set forth.

2. The mode described of melting glass— that is to say, causing the heated lining of the furnace above the body of glass to take, at intervals, a position below the same, while the surface is acted upon by a flame, substantially as described.

3. The combination of a movable melting-furnace with a working trough or troughs, into which the contents of the furnace can be discharged.

In testimony whereof I have signed my name to this specification in the presence of two subscribing witnesses.

RICHARD M. ATWATER.

Witnesses:
WILLIAM COOPER,
HARRY SMITH.